I. Pelham,
Saw Handle,
№ 30,153.  Patented Sep. 25, 1860.
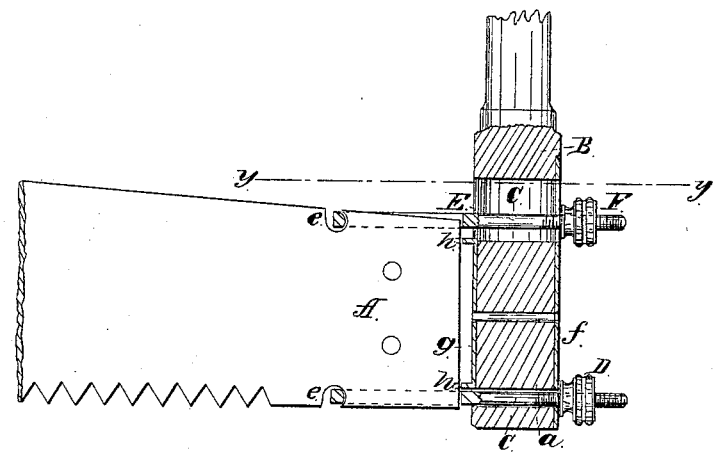
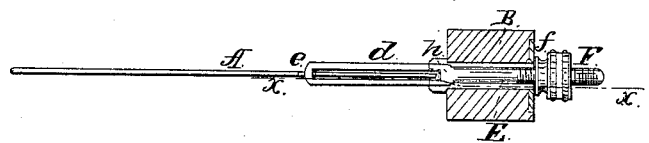
Witnesses:  Inventor:
Isaac Pelham

UNITED STATES PATENT OFFICE.

ISAAC PELHAM, OF ITHACA, NEW YORK.

METHOD OF ATTACHING HANDLES TO CROSSCUT-SAWS.

Specification forming part of Letters Patent No. 30,153, dated September 25, 1860; Reissued March 25, 1873, No. 5,339.

*To all whom it may concern:*

Be it known that I, ISAAC PELHAM, of Ithaca, in the county of Tompkins and State of New York, have invented a new and Improved Manner of Attaching Handles to Crosscut-Saws; and I do hereby declare that the following is a full, clear, and exact description of the same, reference being had to the annexed drawings, making a part of this specification, in which—

Figure 1, is a side sectional view of a handle attached to a saw according to my invention. $x, x$, Fig. 2, indicates the plane of section. Fig. 2, a horizontal section of the same, taken in the line $y, y$, of Fig. 1.

Similar letters of reference indicate corresponding parts in the two figures.

The object of this invention is to attach handles to a cross cut-saw in such a manner that they may be firmly secured to the saw and at the same time admit of being readily removed when necessary in order that the saw may be drawn longitudinally from the kerf when the log presses or binds against its upper surface and prevents a vertical withdrawal of the same—a contingency which always occurs when the log is not supported so that its outer ends will fall when the cut is made and this cannot always be effected, especially with large logs which are mostly sawed on the ground. To enable those skilled in the art to fully understand and construct my invention I will proceed to describe it.

A, represents one end of a cross-cut saw and B, its handle. This handle may be of wood as usual and at its lower part there is a slot $a$, which extends entirely through the handle and is of sufficient dimensions to allow a rod C, to pass through it, said rod having a screw on it on which a thumb nut D, is fitted. Through the handle B, at a point some distance above the slot $a$, there is another slot $c$, which is of much greater depth than slot $a$, but has a screw rod E, passing through it of equal dimensions to C, and with a thumb nut F, on its outer end.

The inner parts of the rods C, E, are of quadrilateral form and slotted longitudinally as shown at $d$, in Fig. 2, the slots being of sufficient width to allow the saw to pass in so that the ends of the square parts of the rods may fit or catch in notches $e, e$, in the upper and lower edges of the saw as will be fully understood by referring to Fig. 1.

The outer side of the lower part of the handle B, has a metal plate $f$, attached against which the thumb nuts D, F, bear, and the inner side of the handle has a metal plate $g$, attached, the ends of which are bent horizontally outward and notched at $h$, to receive the end of the saw.

From the above description it will be seen that by inserting the end of the saw in the notches $h, h$, and fitting the inner ends of the rods C, E, in the notches $e, e$, in the saw and then screwing up the thumb nuts D, F, the handle will be firmly secured to the saw and without the liability of working loose and in case of such a contingency occurring the handle may be readily made tight by screwing up the nuts D, F, the handles being detached when necessary by unscrewing the nuts D, F, and moving the inner ends of the rods C, E, out from the notches $e, e$. By having the upper slot $c$, of requisite depth the upper rod E, may be adjusted vertically to suit saws of different widths.

Having thus described my invention what I claim as new and desire to secure by Letters Patent, is—

The rods C, E, fitted in the handle A, and provided with the screw nuts D, E, and slotted parts $d$, the latter being fitted on the saw and having their ends in notches $e\ e$, therein, the ends of the saw being fitted in the bent notched ends $h, h$, of the plate $g$, essentially as and for the purpose set forth.

ISAAC PELHAM.

Witnesses:
JNO. H. SCOTT,
L. W. BENITRÉ.